May 7, 1929.  J. GOOD  1,711,938
BURNER CARBURETOR COMBINATION
Original Filed Nov. 6, 1919
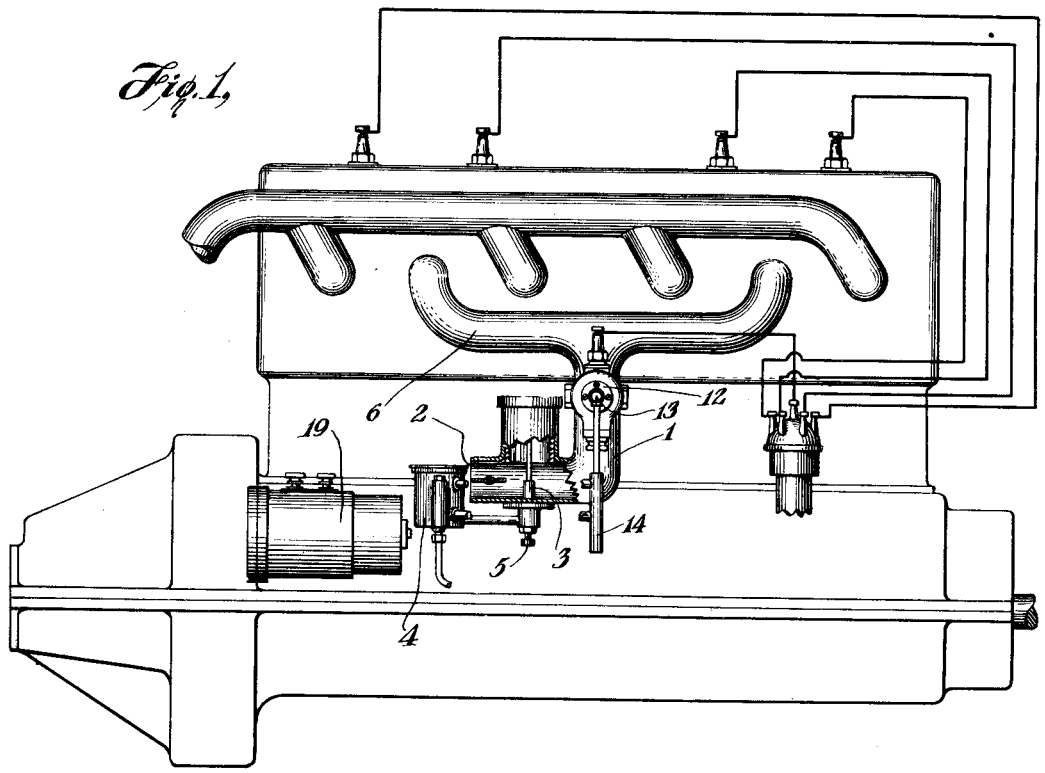
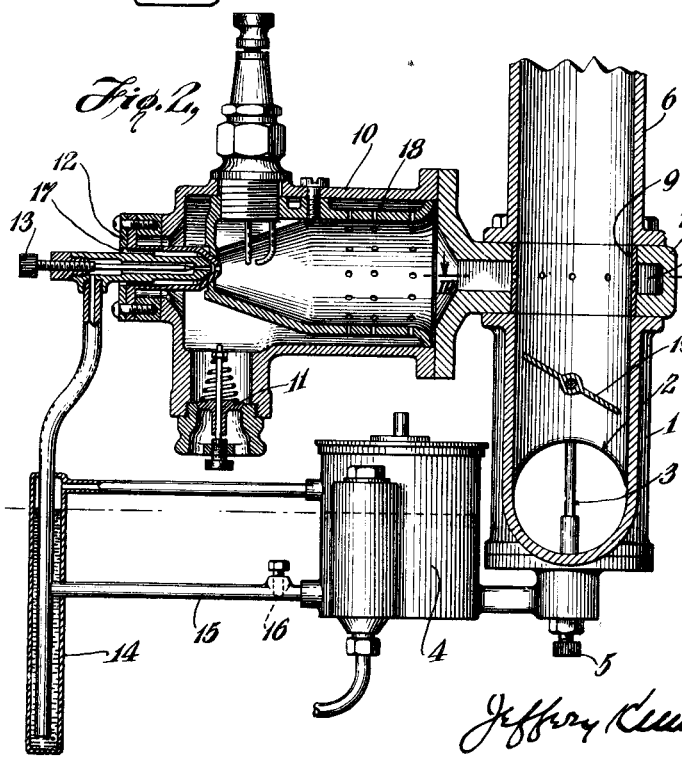
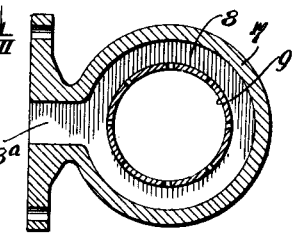

Patented May 7, 1929.

1,711,938

UNITED STATES PATENT OFFICE.

JOHN GOOD, OF GARDEN CITY, NEW YORK, ASSIGNOR TO GOOD INVENTIONS CO., OF NEW YORK, N. Y., A CORPORATION OF NEW YORK.

BURNER CARBURETOR COMBINATION.

Original application filed November 6, 1919, Serial No. 336,027. Patent No. 1,377,989, dated May 10, 1921. Divided and this application filed April 29, 1921. Serial No. 465,613.

The invention relates to combustion means for supplying heat and combustion products to the intake passages of carburetor-type engines, for vaporizing the liquid fuel delivered by the carburetor and generally improving the operation of the engine. The invention consists more especially in the means of connecting a burner to the engine intake passage in such manner as to provide for an efficient application and delivery of the heat and also in the means of adapting suction burners to existing engine installations. This application is a division of my co-pending application now Patent No. 1,377,989.

In the accompanying drawing, Figure 1 shows a conventional form of automotive engine with a suction burner applied to it by means exemplifying this invention, parts being in section and the carburetor float chamber being displaced for convenience of illustration, Figure 2 represents a larger scale section of the burner mechanism in the plane of its longitudinal axis, and Figure 3 a plan of the adapter.

The engine of Fig. 1 has a carburetor 1, which may be of any usual or suitable design and is illustrated as comprising an air passage 2, and a spray nozzle 3 which is supplied with liquid fuel from the float chamber 4 under regulation of a needle valve 5. The outlet from the carburetor is equipped as usual with a throttle and connected to the engine intake header 6 by means of an adapter 7, which is shaped to be inserted between the flanges of the carburetor and header and bolted tightly in place between them. This adapter is formed with a central bore and an interior ring shaped cavity 8 and contains a cylindrical thin-walled metal sleeve or thimble 9, which is seated in the bore so as to make an annular passage embracing and preferably surrounding the thimble. The thimble may be pressed into the bore of the adapter so as to be permanently retained therein or the engagement of the opposing surfaces of the carburetor and intake header flanges against its opposite edges, may be relied on for this purpose; the interior diameter of the thimble is substantially the same as the internal diameters of the carburetor and header so that its interposition imposes no restriction to flow through the intake passage. The latter is considered as the entire path from the entrance 2 to the cylinders. The wall 9 is provided with a plurality of small perforations, surrounding the axis of the intake passage and the channel 8 is in free communication with the interior of the burner, as shown, so that such openings serve as the outlet for the burner leading into the intake.

The exterior burner casing 10 is secured to the flange of the adapter and provided with a spring seated air valve 11, subject to adjustment, and with a liquid fuel spraying means 12 the latter being secured to the end of the burner casing and comprising a fuel duct controlled by a needle valve 13 and adapted to draw liquid fuel from a well 14. The latter is in communication with the float chamber 4 of the carburetor through a pipe 15 provided with an adjustable flow restriction 16, and the upper end of the well, above the level of the liquid therein, indicated by the dotted line, is connected to the air space in the upper part of the float chamber and serves merely as a pressure balance so that the atmospheric pressure ordinarily present in the float chamber may be extended to the well. The spraying means 12 is further provided with air ducts 17 admitting atmospheric air to the orifice of the fuel duct in such manner as to shatter the liquid fuel to a state of fine atomization. The fuel nozzle delivers its spray into an ignition and mixing space constituted by the inner air-distributing shell 18, which is provided with rings of small perforations for admitting air from valve 11, to said space, and a spark plug, or equivalent electric ignitor, is mounted in the burner with its spark gap seated in the path of the atomized spray just before it mixes with the air from the distributing holes.

When the engine is cranked over as by the use of the starting motor 19, or crank, or when the engine is in operation on its own combustion, the suction effect thereby established in the intake header is transmitted through the burner outlet holes in the wall 9 to the ignition and mixing space in the burner coincidently producing inflows of air and fuel therein as will be apparent. Because of the manner of introducing the fuel and air, the mixture occurring within the shell 18 is not homogeneous and the ignition, occurring at a point where the mixture is relatively rich in fuel, does not result in explosion even though the proportions may be suited for complete combustion, or may be those of an explosive mixture, the combustion thus started continues steadily and continuously for as long as a sufficient suction effect is maintained and with such variation in the rate of combustion as may be determined by the variation of the suction. It is preferred to adjust the proportions of the fuel and air admitted to the burner so that the combustion will be substantially complete, i. e. without any great excess of air or fuel inasmuch as this provides for clean operation and maximum heat without soot, etc. The function of the air valve spring is to maintain such a predetermined relation throughout variable rates of burner action and in this respect the maintenance of the proportions is facilitated by the well 14 which also exerts a compensating action on the proportions after the manner of the liquid regulation in many engine carburetors. The said well, however, serves the further function of providing an extra rich condition of the burner mixture when it is first set in action. The liquid level in the well 14 being equal to that in the float chamber is at first lowered rather rapidly, due to the short hydraulic head, until it has reached the level which the gravity flow through the adjusted restriction 16 is adapted to maintain, and thereafter it will remain constant so long as the suction is constant. The initial rich condition facilitates the ignition. The general construction and mode of operation of the burner, including the feature just mentioned are the subject of other applications and patents, but it will be understood that any suitable suction burner design may be substituted for that herein shown within the scope of the present invention. It is desirable and preferred that the burner shall take its fuel directly from the carburetor float chamber and that the air for the burner be taken direct from atmosphere, but it is only essential that two combustible mixtures be produced, one of them ignited for heating purposes and the other unignited.

In its normal use the throttle 19 will be set to an idling position, about as indicated in Figure 2, so that the burner and carburetor will be caused to start operation simultaneously and so that the liquid fuel in the (unignited) carburetor mixture encountering the wall 9 and the flame or hot burner gases of the ignited mixture issuing from the outlet perforations therein will become vaporized thereby and thus produce a medium adapted to ignite instantly or burn effectively in the cylinders even though the latter be extremely cold. The air valve 11 is preferably arranged so that it does not close tight against its seat, a slight leakage being desirable to cause the spray nozzle to cease action promptly when the suction effect stops. It will be understood that the electric ignitor is connected to the engine ignition system or otherwise so as to be in operation when required.

I provide the vaporizing wall 9 with several perforations distributed around and on opposite sides of the intake passage because this arrangement has the effect of extending and spreading the flame and heat round about the wall 9 giving a large and well heated surface on the interior of the intake wall, while the admission of the hot burner products at opposite sides of, or at several points around, the intake passage produces a thorough distribution of the hot gases in the medium flowing through the intake passage as will be apparent. This effect is manifestly not dependent on the location of the wall 9 in an interposed adapter fitting as herein shown and such wall may obviously be otherwise organized in the structure of the intake passage. The number of holes through it is also subject to variation so long as the total area is suited for transmitting an appropriate suction effect from the intake to the burner for the suction operation of the latter. The total area of the outlet holes while always sufficient for the purpose just mentioned may be varied to control the normal rate of combustion in the burner for a predetermined intake suction; the area of a round hole, three sixteenth inch in diameter, is found satisfactory for the type of burner illustrated. If the holes are numerous and fine their tendency is to admit only hot gases into the intake; if larger and fewer, the flame may enter but will not inflame the carburetor mixture. If a single hole is used, it is preferably located on the far side of the annular passage 8 so that a large part of the wall 9 will be certain to be heated and in all cases it is sufficient if the holes are formed by simply drilling through the wall, no masking or baffles being necessary to avoid the passage of flame. That is to say, the burner outlet hole or holes are short, not substantially longer than the thickness of the heating wall and are thus unprotected in respect to flame transmission and the least likely to become clogged. Inasmuch as the burner functions at a rate proportional to the suction transmitted to it, it will be apparent that it will burn at a maximum rate when the engine is idling and diminish as the carburetor delivery increases and it may cease entirely at full open throttle, this being the effect of the location of the burner outlet on the engine side of the throttle, as will be understood. If located elsewhere, its action will correspond to the suction and obviously its rate may be controlled by special controlling means applied to that end regardless of location.

Claims—

1. In an internal combustion engine the combination of the engine intake passage including a carburetor, of a suction burner and means for applying the heat of the burner to the medium flowing in said passage comprising a wall of said passage subject to the burner flame or gases on one side and affording a heating surface on the other side and provided with one or more holes unprotected as to the transmission of flame therethrough extending through said surface and constituting a burner outlet adapted to transmit an operating suction effect to said burner.

2. The combination of an engine intake passage including a carburetor, with a suction burner and means for applying its heat, comprising a wall of said intake passage which affords a heating surface on the inside of said passage, and a series of holes through said wall disposed in distributed or spaced relation therein and together constituting the outlet from the burner and adapted to transmit an operating suction effect from the intake thereto.

3. The combination of an engine intake passage including a carburetor, perforations in a wall of said passage disposed on opposite sides thereof and a suction burner connected to said perforations and adapted to be operated by the intake suction transmitted through said oppositely located burner outlet perforations.

4. The combination of an engine intake passage including a carburetor, of a relatively thin wall forming part of said passage, a burner space embracing said wall, a suction burner in communication with one side of said space and a plurality of openings through said wall adapted to transmit an operating suction effect to the burner.

5. The combination of an engine intake comprising a carburetor and a separately made adapter fitting interposed between parts of said intake passage and constituting a burner outlet and a burner connected to said fitting and adapted to deliver its products through said outlet to the intake.

6. In combination with the intake manifold of an internal combustion engine and a carburetor therefor, a unit insertible between the carburetor and the end of the manifold, which unit contains a passage forming an extension of the intake manifold, a chamber surrounding said extension, and a burner adapted to supply heat to said chamber to heat the walls of said extension.

7. In a hydrocarbon motor, the combination with two separated sections of the motor intake conduit, of a self-contained heater unit arranged between said sections and secured thereto, said unit having a through passage in communication with both sections of said conduit, said unit comprising a combustion chamber in heat transferring relation to said through passage, and means forming a part of said unit adapted to supply explosive mixture to said combustion chamber.

8. In a hydrocarbon motor, the combination with two separated sections of the motor intake conduit, of a self-contained heater unit arranged between said sections and secured thereto, said unit having a through passage in communication with both sections of said conduit, said unit comprising a combustion chamber in heat transferring relation to said through passage, and means forming a part of said unit adapted to supply explosive mixture to said combustion chamber independently of the mixture in the feeding section of said conduit.

9. In a hydrocarbon motor, the combination with two separated sections of the motor intake conduit, of a self-contained heater unit arranged between said sections and secured thereto, said unit having a through passage in communication with both sections of said conduit, said unit comprising a combustion chamber in heat transferring relation to said through passage, and carburetor means formed as a part of said unit and adapted to supply mixture to said chamber.

In testimony whereof, I have signed this specification.

JOHN GOOD.